United States Patent [19]

Müller

[11] 4,059,438
[45] Nov. 22, 1977

[54] PROCESS FOR THE WORK-UP OF A CONTAMINATED INACTIVE MERCURY(II)CHLORIDE/ACTIVE CARBON-CATALYST

[75] Inventor: Heinz Müller, Bruhl, Germany

[73] Assignee: Hoechst Aktiengesellschaft, Knapsack, near Cologne, Germany

[21] Appl. No.: 718,108

[22] Filed: Aug. 27, 1976

Related U.S. Application Data

[63] Continuation of Ser. No. 530,872, Dec. 9, 1974, abandoned.

[30] Foreign Application Priority Data

Dec. 13, 1973 Germany .......................... 2361917

[51] Int. Cl.$^2$ ............................................. C22B 43/00
[52] U.S. Cl. .......................................... 75/81; 266/148
[58] Field of Search ................ 252/416, 419; 75/81, 75/121; 266/147, 148; 423/107

[56] References Cited

U.S. PATENT DOCUMENTS

| 1,883,635 | 10/1932 | Ebbets | 266/147 |
| 3,537,843 | 11/1970 | Jacobowsky | 75/81 |
| 3,615,363 | 10/1971 | Montes de Oca | 266/148 |
| 3,790,370 | 2/1974 | Lalancette | 75/121 |

FOREIGN PATENT DOCUMENTS

| 46-9549 | 3/1971 | Japan | 252/416 |
| 1,121,845 | 7/1968 | United Kingdom | 75/81 |

*Primary Examiner*—Winston A. Douglas
*Assistant Examiner*—P. E. Konopka
*Attorney, Agent, or Firm*—Connolly and Hutz

[57] ABSTRACT

Contaminated inactive mercury(II)chloride/active carbon-catalysts are worked-up. To this end the invention provides for the active carbon to be burnt with the quantity of air or oxygen or mixtures thereof necessary to produce combustion gases containing metallic mercury in vapor form together with between 0.5 and 5% by volume of oxygen and between 2 and 15% by volume of carbon monoxide; for the combustion gases to be contacted in a condensation zone with water so as to effect separation of the mercury therein; for the gases issuing from the condensation zone to be conveyed through a scrubbing zone having an alkaline liquor therein; and for the gases leaving the scrubbing zone to be delivered to the atmosphere.

The apparatus for carrying out the process, which is comprised of a shaft furnace being provided in its base portion with a grate and with an ignition flap opening thereinto, and of a scrubbing tower being positioned downstream, in the direction of flow, of the furnace and receiving an alkaline liquor, is characterized in that the shaft furnace is provided in its base portion with a catalyst-supplying downpipe opening thereinto above the ignition flap; in that a condensation zone receiving water and terminating with its lower end in an outlet valve for the removal of mercury therethrough, is positioned between the shaft furnace and the scrubbing tower; and in that the upper end of the scrubbing tower terminates in a conduit running to the suction side of the fan.

4 Claims, 1 Drawing Figure

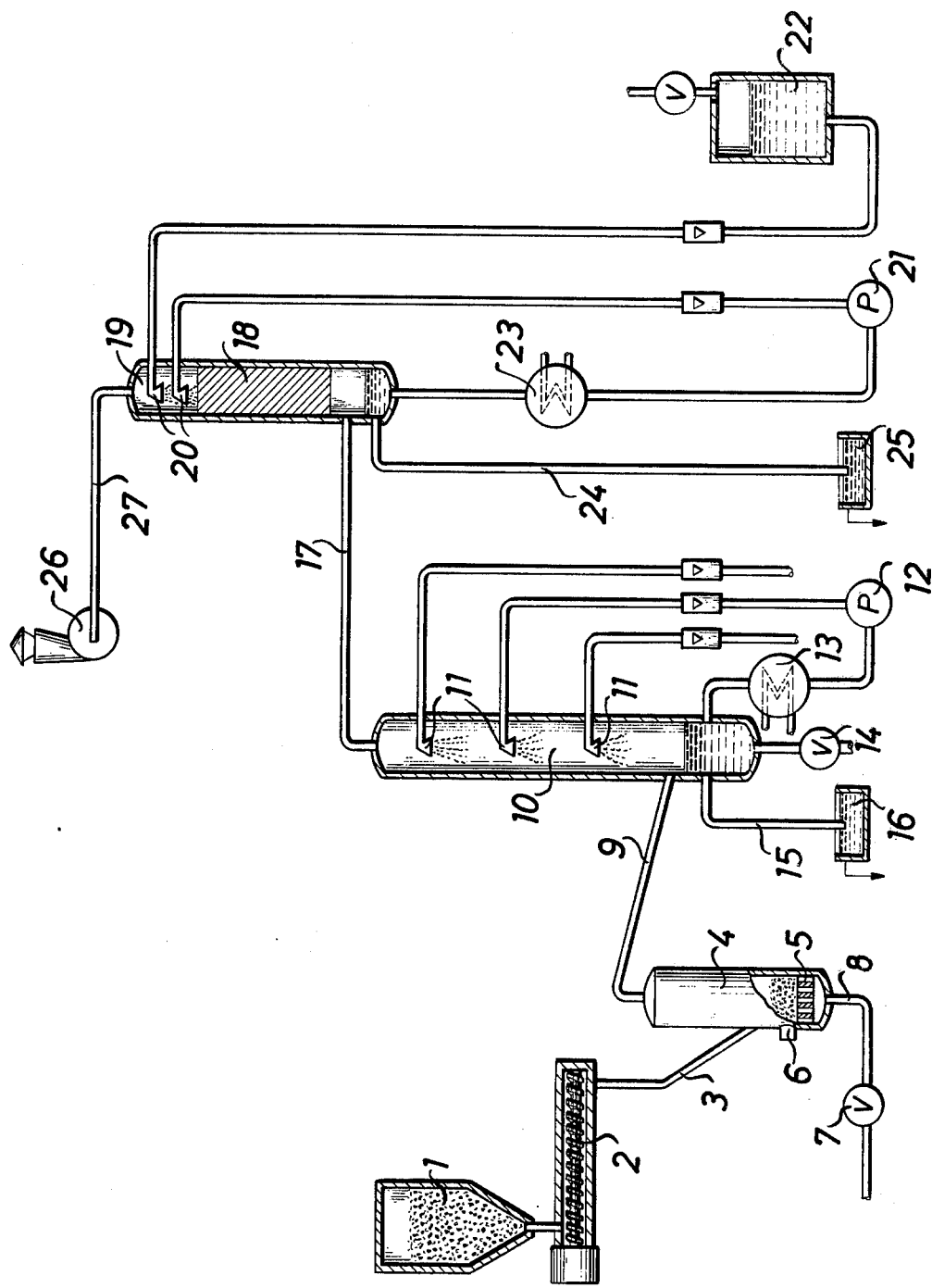

PROCESS FOR THE WORK-UP OF A CONTAMINATED INACTIVE MERCURY(II)CHLORIDE/ACTIVE CARBON-CATALYST

This application is a continuation of application Ser. No. 530,872 filed Dec. 9, 1974 now abandoned.

The present invention relates to a process for the work-up of a contaminated inactive mercury(II)-chloride/active carbon-catalyst, and to an apparatus for carrying out the process.

Vinyl chloride is produced from acetylene and hydrogen chloride with the use of an active carbon catalyst being impregnated with approximately 10 weight% of mercury(II)chloride. In contact with the catalyst, the above components undergo an exothermal reaction at temperatures which are maintained within the range 120° and 150° C, by cooling, in a contact furnace. At that temperature, however, mercury(II)chloride already commences sublimation and phosphorus and sulfur compounds, originating from the acetylene, as well as condensation and polymerization products penetrate into the pores, and reduce the surface area, of the active carbon catalyst. As result, the catalyst is fatiguing increasingly. The standard service life is within the range 8 and 15 months after which the catalyst is normally inactive, for a residual mercury(II)-chloride content approximately within the range 1.5 and 4 weight% therein. In other words, the contaminated inactive catalyst is very likely to contaminate the ground water so that it is necessary for it to be worked up prior to discarding it.

A process for recovering mercury from mercury(II)-chloride/active carbon-catalysts has been described in German Patent No. 1,558,415, wherein the active carbon is burnt in contact with a theoretically insufficient quantity of oxygen or air and a mixture of mercury, mercury(I)chloride and mercury(II)-chloride is expelled by means of the combustion gases which are cooled to effect condensation of the mercury and of its compound. Following this, mercury(I)- and -(II)chlorides which are contained in the condensate, are reduced to metallic mercury by the addition of a reductant, such as hydrazine sulfate, iron(II)sulfate or formaldehyde. The resulting mercury which has coal dust most finely dispersed therein is therefore required to be predried on a suction filter or similar device and then to be distilled in a steel retort.

This known process is, however, not fully satisfactory as the predried mercury having coal dust therein is likely to undergo self-ignition on the suction filter, or on delivering it from the suction filter to a steel retort. The self-ignition is obviously caused by phosphorus or its suboxides which may be formed on burning the catalyst having inter alia phosphorus compound contaminants therein, in the presence of active carbon and carbon monoxide. The self-ignition is accompanied by the evolution of white $P_2O_5$ in vapor form irritating the throat and mucous membranes.

The present invention now provides a process for the work-up of a contaminated inactive mercury(II)-chloride/active carbon-catalyst, and an apparatus for carrying out the process, which avoid the disadvantageous effects referred to hereinabove. The invention provides more particularly for the mercury contaminated with fine coal dust to be freed from phosphorus or its suboxides and to be thereby deprived of its self-ignitability. To this end, the invention provides for the active carbon to be burnt with the quantity of air or oxygen or mixtures thereof necessary to produce combustion gases containing metallic mercury in vapor form together with between 0.5 and 5% by volume of oxygen and between 2 and 15% by volume of carbon monoxide; for the combustion gases to be contacted in a condensation zone with water so as to effect separation of the mercury therein; for the gases issuing from the condensation zone to be conveyed through a scrubbing zone having an alkaline liquor therein; and for the gases leaving the scrubbing zone to be delivered to the atmosphere.

Further preferred features of the process of the present invention provide:

a. for the combustion gases to contain between 1 and 3% by volume of oxygen;
b. for the combustion gases to contain between 4 and 10% by volume of carbon monoxide; and
c. for sodium hydroxide solution to be used as the alkaline liquor.

In the process of the present invention, the phosphorus and sulfur compounds, which are contained in the active carbon component of the catalyst, are completely transformed to $P_2O_5$ and $SO_2$, while the mercury-(II)-chloride component of the catalyst is simultaneously reduced quantitatively to metallic mercury. It is accordingly not necessary for the condensate to be subjected to further treatment with a reductant, such as hydrazine, iron(II)sulfate or formaldehyde. The bulk of $P_2O_5$, $SO_2$ and HCl contained in the combustion gases is absorbed by the water introduced into the condensation zone. It is therefore good practice continually to remove, neutralize and filter a portion of the water under circulation in the condensation zone. As the resulting filtrate is substantially free from mercury, it is possible for it to be directly delivered to a waste water system.

The combustion gas which is freed in the condensation zone from mercury and the bulk of acid ingredients therein, is delivered to the scrubbing zone having an alkaline liquor therein and scrubbed until free from acid. The gas coming from the scrubbing zone contains between 1 and 2 mg of mercury per cubic meter and can be delivered to the atmosphere.

Metallic mercury having residual coal dust most finely distributed therein is removed through the bottom portion of the condensation zone, predried and distilled in a steel retort.

The accompanying drawing is a diagrammatic representation of an exemplary form of apparatus for carrying out the process of the present invention.

As can be seen, contaminated inactive catalyst is delivered from a reservoir 1 through a conveyor belt 2 and a downpipe 3 to a grate 5 disposed in the bottom portion of a shaft furnace 4. It is generally good practice to provide for the grate 5 to be charged with a relatively little quantity of catalyst. Arranged between the grate 5 and the point where the downpipe 3 opens into the shaft furnace 4 is an ignition flap 6. The shaft furnace 4 is furthermore provided with an air inlet 7 having a stop valve 8 positioned therein and with a combustion gas outlet 9. The air inlet 7 opens into the bottom portion, and the gas outlet 9 extends from the head of, furnace 4.

Combustion outlet 9 opens into the base portion of a condensation tower 10 having a plurality of nozzles 11 centrally disposed therein with one downstream of another. The nozzles 11 are connected to a pump 12 receiving liquid coming from the base portion of the condensation tower 10 and travelling through a heat exchanger 13 positioned between the tower 10 and the pump 12. Positioned downstream of the tower 10 is an outlet valve 14 permitting condensed metallic mercury to be removed therethrough. Placed below the point where the combustion gas outlet 9 opens into the condensation tower 10 is a gooseneked outlet 15, which runs from the tower 10 to, and terminates in, a neutralization basin 16. The head of tower 10 terminates in a further gas conduit 17.

The gas conduit 17 opens into the base portion of a scrubbing tower 19 packed with filler material 18. A plurality of nozzle structures 20 are centrally disposed one downstream of another in the upper portion of tower 19. The nozzle structures 20 are connected to a pump 21 or a reservoir 22 having sodium hydroxide solution therein. The pump 21 receives and conveys an alkaline liquor coming from the base portion of the scrubbing tower 19 and travelling through a heat exchanger positioned between the tower 19 and the pump 21. Placed below the point where the gas outlet 17 opens into the scrubbing water 19 is a gooseneked outlet 24 which runs from the tower 19 to, and terminates in, a basin 25.

The head of scrubbing tower 19 terminates in a conduit 27 which is connected to the suction side of a fan 26 delivering off-gas having between 1 and 2 mg of mercury per cubic meter therein to the atmosphere.

The apparatus for carrying out the process of the present invention, which is comprised of a shaft furnace being provided in its base portion with a grate and with an ignition flap, and of a scrubbing tower being positioned downstream, in the direction of flow, of the furnace and receiving an alkaline liquor, is more particularly characterized in that the shaft furnace 4 is provided in its base portion with a catalyst-supplying downpipe 3 opening thereinto above the ignition flap 6; in that a condensation zone 10 receiving water and terminating with its lower end in an outlet valve 14 for the removal of mercury therethrough, is positioned between the shaft furnace 4 and the scrubbing tower 19; and in that the upper end of scrubbing tower 19 terminates in a conduit 27 running to the suction side of a fan 26.

Further preferred features of the apparatus of the present invention provide:

d. for the shaft furnace 4 to be provided with a lockable air inlet 8 projecting thereinto from below;
e. for the condensation zone 10 to be provided in its base portion with a gooseneked outlet 15 projecting therefrom;
f. for the outlet 15 to terminate in a neutralization basin 16;
g. for the condensation zone 10 to be provided with at least one nozzle structure 11 being centrally disposed therein and supplying water thereto;
h. for three nozzle structures 11 to be arranged in the condensation zone, one downstream of another;
i. for the scrubbing tower 19 to be provided in its base portion with a gooseneked outlet 24 projecting therefrom;
j. for the outlet 24 to terminate in a neutralization basin 25;
k. for the scrubbing tower 19 to be provided with at least one nozzle structure 20 being centrally disposed therein and supplying alkaline liquor thereto; and
l. for two nozzle structures 20 to be arranged in the scrubbing tower one downstream of the other.

EXAMPLE

A shaft furnace with 0.03 m$^2$ grate surface area was fed with 9.4 kg/h of a catalyst containing 2.6 weight% of mercury. After ignition of the catalyst by means of a pilot flame, which was introduced through the ignition flap, the flap was closed and air was supplied at a rate of 30 m$^3$/h. The combustion gas issuing from the shaft furnace contained 2.0% by volume of oxygen and 8.9% by volume of CO.

4.5 m$^3$/h of an acid liquor of 24° C was kept under circulation in the condensation tower, by means of a pump. 0.6 l/h of acid liquor was removed through the outlet opening and replaced by fresh water.

1.5 m$^3$/h of alkaline liquor of 20° C was kept under circulation in the scrubbing tower, by means of a pump. Approximately 1 l/h of 20% sodium hydroxide solution was supplied to maintain the liquor alkaline. A corresponding quantity of liquor was removed from the scrubbing tower, through the outlet opening.

32 m$^3$/h of off-gas containing less than 1 mg of Hg/m$^3$ was delivered to the atmosphere, through fan 26.

I claim:

1. A process for the work-up of a contaminated inactive mercury (II) chloride/active carbon-catalyst having a mercury (II) chloride content within the range 1.5 to 4 weight% by burning said catalyst in a furnace, which process comprises charging said furnace with constituents initially including a portion of said catalyst; igniting said catalyst portion by means of a pilot flame introduced into said furnace; then continuously charging said furnace with the catalyst balance portion together with air or oxygen or mixture thereof so as to accomplish a complete and self-sustaining combustion of the active carbon contained in said catalyst, the air or the oxygen or the mixture thereof being fed in the quantity necessary to produce combustion gases containing metallic mercury in vapor form together with between 0.5 and 5% by volume of oxygen and between 2 and 15% by volume of carbon monoxide; injecting water into the combustion gases issuing from said furnace so as to condense metallic mercury therefrom; conveying the remaining gases through a scrubbing zone having an alkaline liquor therein; and delivering the gases leaving the scrubbing zone to the atmosphere, said gases containing less than 1 mg mercury/cbm.

2. The process as claimed in claim 1, wherein the combustion gases contain between 1 and 3% by volume of oxygen.

3. The process as claimed in claim 1, wherein the combustion gases contain between 4 and 10% by volume of carbon monoxide.

4. The process as claimed in claim 1, wherein sodium hydroxide solution is used as the alkaline liquor.

* * * * *